Inventor:
Joseph Armand Bombardier

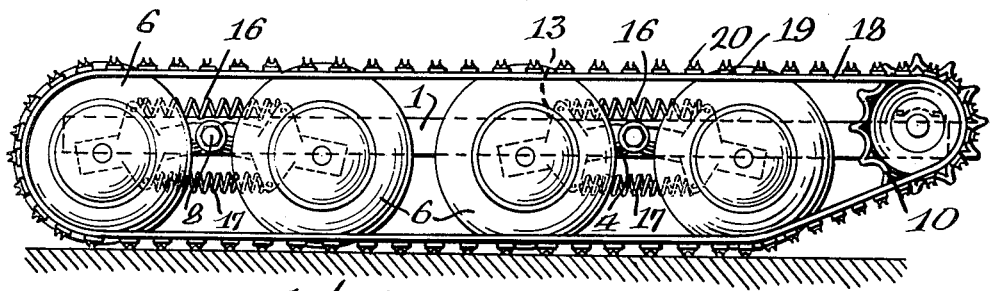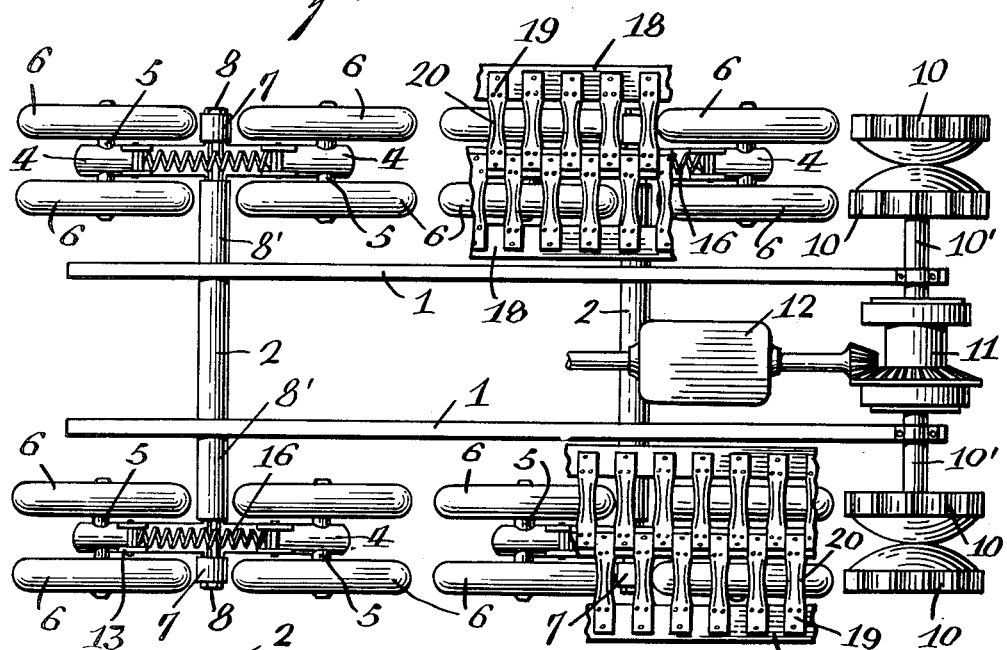
Inventor:
Joseph Armand Bombardier

Patented Jan. 23, 1945

2,367,751

UNITED STATES PATENT OFFICE 2,367,751

WHEEL MOUNTING

Joseph Armand Bombardier, Valcourt, Quebec, Canada

Application October 15, 1942, Serial No. 462,178

2 Claims. (Cl. 280—124)

The present invention pertains to a novel wheel mounting for heavy vehicles. It is designed especially, although not exclusively, for heavy vehicles of the chain tread type as disclosed in my co-pending United States application, Serial No. 449,852 filed July 6, 1942, Patent No. 2,346,351, April 11, 1944. This application is a continuation in part of the co-pending application.

The general object of the invention is to simplify further the wheel mounting and to adapt the wheel assembly for a double chain on each side of the chassis. Another object is to provide a spring suspension for the load.

In the accomplishment of these objects, the end of each axle has applied thereto a pair of curved members or plates disposed oppositely to each other and adapted to rotate to a limited extent on the axle. From each such member, an arm extends lengthwise of the vehicle, the two arms extending oppositely to each other from the axle although being in alinement. Suitable retaining means are provided to prevent these members from slipping off the axles while permitting the rotative movement.

The arms carry wheels near or at the outer ends. At each end of each arm is preferably provided a pair of wheels on a common axis, thus enabling the use of a double chain tread. Such a tread is provided at each side of the vehicle and is driven by a double pinion.

The spring support for the load is obtained through a novel construction associated with the aforementioned arms. Each arm has spring engaging means both above and below its own axis. The upper ends of a given pair of arms are engaged by a compression spring mounted therebetween, while the lower means are attached to a tension spring. When the vehicle is not loaded, this arrangement of springs brings the axle above the plane of the wheel centers, while varying loads bring the axle correspondingly lower. The adjustability of the axle in this manner, automatically and yieldingly, obviously constitutes a spring support for the load.

The invention is more fully disclosed by way of example in the following description and in the accompanying drawings in which:

Figure 4 is an elevation of the drive and traction assembly;

Figure 5 is a plan view thereof;

Figure 6 is a detail cross section illustrating the chain tread construction, and Figure 7 is a transverse section of an end of one of the axles.

Reference to these views will now be made by use of like characters which are employed to designate corresponding parts throughout.

The frame structure of the vehicle is represented by two longitudinal members 1, and through these are passed a pair of transverse tubular axles 2, one at the rear and the other forward thereof but not at the forward extremity.

Figure 3:
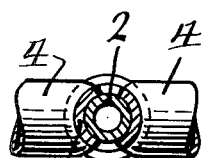
Figure 3 is a detail longitudinal section.

The end portions of each axle are engaged by a pair of arcuately shaped plates or cheeks 3, as shown more clearly in Figures 3 and 7. From each cheek 3 is extended an arm 4, in the form of a hollow tube, lying lengthwise of the vehicle. The arms of each pair lie on opposite sides of the corresponding axle, forming therewith a cross shaped structure.

Figure 2:
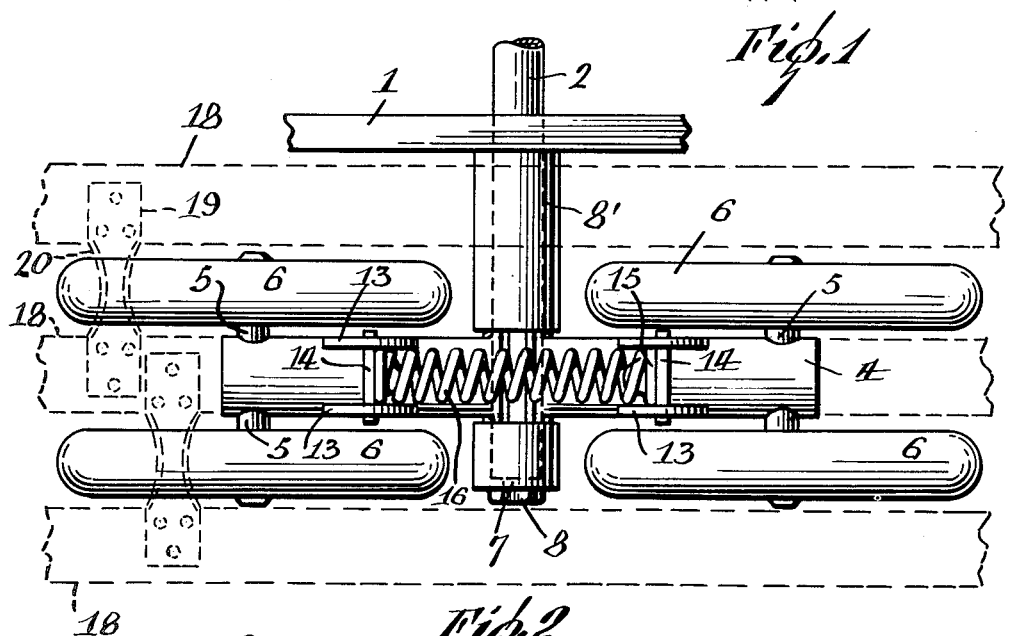
Figure 2 is a plan view thereof.

Through the outer end of each arm 4 is passed a pin or journal 5 (Figure 2) carrying a wheel 6 on each end or on each side of the arm. Thus, the assembly at each axle comprises four wheels. These may be rubber tired in the manner and for the purpose described in the above named co-pending application.

In order to hold each such assembly from slipping, a cap 7 is fitted on the outer end of each pair of cheeks 3 and is secured by a headed screw 8 threaded into the tubular axle 2. A spacing ring 9 is mounted between the adjacent frame member 1 and the inner ends of the cheeks 3, and finally an outer sleeve 8' encloses the spacer and portions of the cheeks between the arms 4 and the adjacent frame member 1. The arms are fixed to the respective cheeks in any suitable manner, preferably by welding.

The double wheels at each side of the frame require a double chain, presently to be described, and likewise double sprockets 10 at each side of the frame as illustrated in Figure 5. Each pair of sprockets is mounted on a stud shaft 10' journalled on the adjacent frame member 1. For balancing the propulsion of the vehicle, the stub shafts are driven through a differential 11 which receives its drive from a transmission 12.

Figure 1:
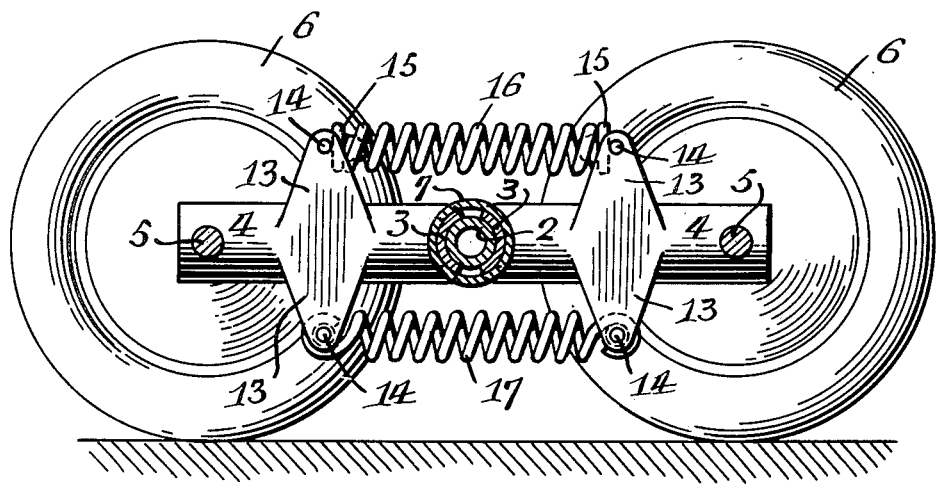
Figure 1 is a detail elevation of one of the wheel units, certain parts being shown in section.

Each arm 4 is provided with a pair of opposed lugs 13 extending both above and below the axis of the arm, as shown in Figure 1. Pins 14 are passed transversely through the upper and lower ends of each pair of lugs to bridge said ends and form a spring mounting as will presently be shown. The upper pins are soldered to spring seats 15 directed towards each other, and between each such pair of seats is mounted a compression spring 16, the ends of which receive the seats. On the lower pins are hooked the ends of an expansion spring 17.

The tread member at each side of the vehicle comprises three endless bands 18 of rubber, leather or other suitable material, one of the bands being disposed between the alined wheels 6 and the remaining bands respectively at the outer sides. From the outer bands transverse bars 19 extend to the intermediate band. Each bar is secured to two bands, and one set alternates with the other, as shown in Figure 5. The bars 19 are curved on their outer surface to form suitable rows of gripping teeth 20. The teeth of the sprockets 10 are adapted to engage between successive bars 19 and thus move the chain tread.

When the vehicle carries no load as in Figure 4, the expansion of the compression springs 16 and the contraction of the tension springs 17 brings the axle 2 above the plane of the journals 5, it being understood that the cheeks 3 carrying the arms 4 are free to slide circumferentially on the respective axles 2. When the vehicle is fully loaded, as in Figure 1, each axle 2 is in the same plane with its corresponding journals 5. Intermediate positions will of course occur according to the load, and it will be evident from the foregoing that a spring suspension for the load is provided.

For the purpose of adjusting the tension of the treads, each of the rearmost axles 5 may be mounted in a suitable device for adjusting its position as shown in Figures 9 and 10 of my co-pending application.

The construction herein described is considerably simpler and less expensive, in the matter of mounting the wheels, than that shown in the co-pending application. Moreover, a double track at each side of the vehicle is provided, as well as a spring suspension for the load. Tubular parts are preferably used wherever possible in order to reduce the weight.

Although a specific embodiment of the invention has been disclosed, it may be understood that various alterations may be made without departing from the scope of the invention.

What I claim as my invention is:

1. In a vehicle having a chassis and a transverse axle therethrough, a wheel mounting comprising a pair of curved members fitted on said axle at opposite sides of its axis and adapted to turn thereon, an arm extending from each said member longitudinally of said chassis, said arms lying at opposite sides of said axle, a wheel journalled on the outer end of each arm, a spacer between said members and the adjacent side of said chassis, means on the outer end of said axle for retaining said members, and a sleeve enclosing said spacer and a portion of said members and lying between said chassis and said arms.

2. In a vehicle having a chassis and a transverse axle therethrough, a wheel mounting comprising a pair of curved members fitted on said axle at opposite sides of its axis and adapted to turn thereon, an arm extending from each said member longitudinally of said chassis, said arms lying at opposite sides of said axle, a wheel journalled on the outer end of each arm, a compression spring joining said arms above said axle, a tension spring joining said arms below said axle, a spacer between said members and the adjacent side of said chassis, means on the outer end of said axle for retaining said members, a sleeve enclosing said spacer and a portion of said members and lying between said chassis and said arms.

JOSEPH ARMAND BOMBARDIER.